J. MALOY.
CAR-COUPLING.
No. 180,141. Patented July 25, 1876.
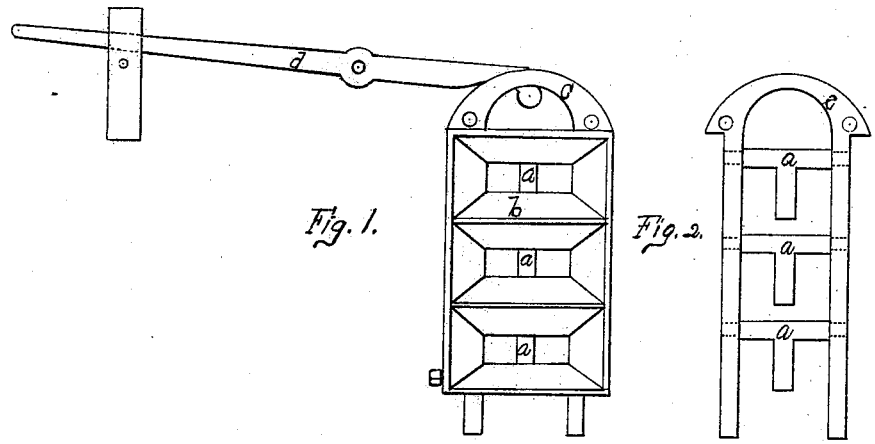
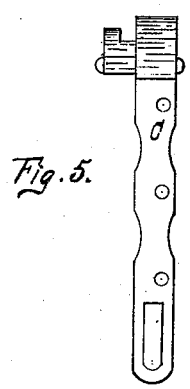
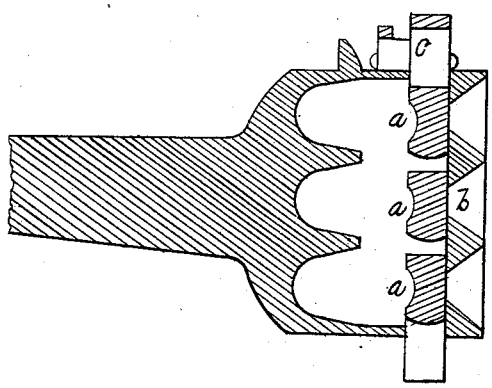

UNITED STATES PATENT OFFICE.

JOSEPH MALOY, OF PONTIAC, MICHIGAN, ASSIGNOR OF ONE-HALF HIS RIGHT TO JUNIUS TEN EYCK, OF SAME PLACE, AND SAID MALOY AND TEN EYCK ASSIGNORS OF ONE-SIXTH OF THEIR RIGHT TO HENRY W. LORD, OF SAME PLACE.

IMPROVEMENT IN CAR-COUPLINGS.

Specification forming part of Letters Patent No. 180,141, dated July 25, 1876; application filed June 10, 1876.

*To all whom it may concern:*

Be it known that I, JOSEPH MALOY, of the city of Pontiac, county of Oakland, and State of Michigan, have invented a new and useful Improvement in Car-Couplings, which invention is fully set forth in the following specification, reference being had to the accompanying drawings.

The object of my invention is to provide a coupling-head on the draw-bar of a railroad-car with a coupling apparatus, so that the cars couple themselves the moment they come together, without any manual assistance whatever, or danger to life or limb; and the uncoupling is also performed without entering between the cars, by the common lever extending to the side or top of freight-cars, and on the platform of passenger-cars, from the said coupling-head.

The coupling is illustrated more in detail in the accompanying drawing.

Figure 1 represents the front outside view of the coupling-head on the end of the ordinary draw-bar, made of iron or other suitable material, about eight inches wide by about sixteen inches long and about eight inches deep, with front corners rounded, with three openings therein, at equal distances apart, beveled on each side $b$ for the link to enter. On the inside of the head is a sliding frame, $c$, of wrought-iron or other suitable material, sixteen inches long, about eight inches wide between the joints, and about two by three and three-fourths inches thick. At the top, in the middle and near the bottom of frame $c$, are suspended three tongues, $a\ a\ a$, of wrought-iron or other suitable material, held by and working on a pivot (as in Fig. 2) through said frame $c$. Said tongues $a\ a\ a$ in Fig. 2 are about four inches long, two inches wide by one and one-half inch thick, and concave on the inside, said frame $c$ and tongues $a\ a\ a$, with the openings $b\ b\ b$, forming a kind of buckle, the tongue holding the link inside the frame. The frame slides up and down in grooves on the inside of the head, with a slot and set-screw in the side to regulate and hold the frame in place. When the frame is raised about four inches the uncoupling is completed. To raise the frame I employ the common lever attached to the head of the frame, as shown in Fig. 1, extending to outside of freight-cars, or to the top, if so desired, and on the platform of passenger-cars, either perpendicularly or horizontally, or by an eccentric, if preferred. The coupling-head can have one, two, three, or more openings, $b$, as shown in Fig. 1, as may be required for different heights of cars, the openings being four inches apart. A coupling-head with three openings will couple cars differing in height to the extent of twenty-four inches. The link, being of sufficient length, when placed in either opening, is held in the proper position by the weight of the frame and shape of the openings, and requires no hand-work or other machinery to direct it surely into the opening in opposite draw-head, striking the tongue as it hangs suspended in the opening, and driving it back and upward until it falls by its own weight inside of the link and forms the connection.

I claim as my invention—

The coupling-head provided with the openings $b$, in combination with the frame $c$, sliding therein and having the pivoted tongues $a$, all substantially as described.

JOSEPH MALOY.

Witnesses:
JEROME W. ROBBINS,
FRANKLIN A. CRAWFORD.